United States Patent [19]

Hagihara et al.

[11] Patent Number: 5,395,544
[45] Date of Patent: Mar. 7, 1995

[54] ESTER-CONTAINING WORKING FLUID COMPOSITION FOR REFRIGERATING MACHINE

[75] Inventors: Toshiya Hagihara, Izumisano; Akimitsu Sakai, Wakayama, both of Japan

[73] Assignee: Kao Corporation, Tokyo, Japan

[21] Appl. No.: 83,564

[22] Filed: Jun. 30, 1993

[30] Foreign Application Priority Data

Jul. 4, 1992 [JP] Japan .................. 4-200557

[51] Int. Cl.$^6$ .................. C09K 5/04; C10M 105/38
[52] U.S. Cl. .................. 252/68; 252/56 R; 252/56 S
[58] Field of Search .................. 252/56 R, 56 S, 68

[56] References Cited

U.S. PATENT DOCUMENTS

| | | | |
|---|---|---|---|
| 4,212,816 | 7/1980 | Hentschel et al. | 252/56 S |
| 4,302,343 | 11/1981 | Carswell et al. | 252/33.4 |
| 4,851,144 | 7/1989 | McGraw et al. | 252/52 A |
| 4,959,169 | 9/1990 | McGraw et al. | 252/68 |
| 5,021,179 | 6/1991 | Zehler et al. | 252/68 |
| 5,057,247 | 10/1991 | Schmid et al. | 252/56 S |
| 5,096,606 | 3/1992 | Hagihara et al. | 252/68 |
| 5,185,092 | 2/1993 | Fukuda et al. | 252/56 S |
| 5,202,044 | 4/1993 | Hagihara et al. | 252/68 |
| 5,211,884 | 5/1993 | Bunemann et al. | 252/56 S |

FOREIGN PATENT DOCUMENTS

| | | |
|---|---|---|
| 0406479 | 1/1991 | European Pat. Off. . |
| 0415778 | 3/1991 | European Pat. Off. . |
| 0430657 | 6/1991 | European Pat. Off. . |
| 0445611 | 9/1991 | European Pat. Off. . |
| 0475751 | 3/1992 | European Pat. Off. . |
| 0479338 | 4/1992 | European Pat. Off. . |
| 0480479 | 4/1992 | European Pat. Off. . |
| 0485979 | 5/1992 | European Pat. Off. . |
| 0498152 | 8/1992 | European Pat. Off. . |
| 0536814 | 4/1993 | European Pat. Off. . |
| 536940 | 4/1993 | European Pat. Off. . |
| 3217493 | 9/1991 | Japan . |
| WO9012849 | 11/1990 | WIPO . |

OTHER PUBLICATIONS

Database WPI, Week 9310, Derwent Publications Ltd. AN 93-080650 & JP-A-5 025 484 (KAO) Feb. 2, 1993 (Abstract).

*Primary Examiner*—Stephen Kalafut
*Assistant Examiner*—James M. Silberman
*Attorney, Agent, or Firm*—Birch, Stewart, Kolasch & Birch

[57] ABSTRACT

The present invention is directed to a working fluid composition for a refrigerating machine which contains difluoromethane and a refrigeration oil. An ester formed between (a) an aliphatic polyhydric alcohol having a carbon number of 2 to 12; and (b) a saturated aliphatic monocarboxylic acid having a carbon number of 4 to 9 or a derivative thereof, the ratio of the number of acyl groups having a branched chain or branched chains to the number of the entire acyl groups in the ester being not less than 95%, is used as a base oil of the refrigeration oil. The working fluid composition for refrigerating machine of the present invention is excellent not only in compatibility, lubricity, and electric insulating property but also in thermal stability as compared to the conventional products.

14 Claims, No Drawings

ESTER-CONTAINING WORKING FLUID COMPOSITION FOR REFRIGERATING MACHINE

FIELD OF THE INVENTION

The present invention relates to a working fluid composition for a refrigerating machine, and more specifically to a working fluid composition for a compression refrigerating machine using difluoromethane (HFC32) as a refrigerant.

BACKGROUND OF THE INVENTION

Recently, it was determined that the use of dichlorodifluoromethane (CFC12) for refrigerators and automotive air conditioners would be legally banned in order to protect the ozone layer, and also that the use of chlorodifluoromethane (HCFC22) is about to be legally regulated. Thus, hydrofluorocarbons which do not destroy the ozone layer, such as difluoromethane (HFC32), have been developed as substitutes for HCFC22.

As refrigeration oils which can be used in combination with the hydrofluorocarbons, there have been so far reported esters, carbonates, polyalkylene glycols, etc. Among them, the esters are most preferable for the following reasons: (1) They have a high electric insulating property; (2) they have a low hygroscopicity; and (3) they do not generate non-condensed gases, such as carbon dioxide, etc. Therefore, the esters have started to be used in a compression refrigerating machine for electric refrigerators, etc., in which 1,1,1,2-tetrafluoroethane (HFC134a) is used as a refrigerant.

Examples of such esters are numerously disclosed, for instance in British Patent No. 2,216,541, U.S. Pat. No. 5,021,179. European Patent Publication Nos. 445,610, 445,611, 458,584 and 468,729, International Publication No. WO 90/12849 (corresponding to Japanese Patent Unexamined Publication No. 505602/1991), Japanese Patent Laid-Open Nos. 88892/1991, 128991/1991, 128992/1991, 179091/1991, 200895/1991, 200896/1991, 217494/1991, 227397/1991, 252497/1991, 4294/1992, 20597/1992, 25595/1992, 72390/1992, 85396/1992, 88096/1992, 91194/1992, etc. However, all of these patent publications teach only the esters used in combination with 1,1,1,2-tetrafluoroethane and they are completely silent with regard to the use of difluoromethane (HFC32). Specifically, the esters which can be used in combination with difluoromethane are not taught therein. Also, in all of the Examples of these publications, only the use of 1,1,1,2-tetrafluoroethane is disclosed.

Difluoromethane (HFC32) is a preferred refrigerant, from the viewpoint of refrigerating capacity, as a refrigerant for room air conditioners and package air conditioners. However, since difluoromethane (HFC32) has a higher polarity than 1,1,1,2-tetrafluoroethane (HFC134a), it poses a compatibility problem at a low temperature with the esters presently used in a compression refrigerating machines for electric refrigerators, etc. in which 1,1,1,2-tetrafluoroethane (HFC134a) is used as a refrigerant.

Therefore, a development of an ester having an excellent compatibility with difluoromethane (HFC32) is in demand in the field of art.

SUMMARY OF THE INVENTION

Accordingly, an object of the present invention is to provide a working fluid composition for a refrigerating machine having not only an excellent electric insulating property and low hygroscopicity, but also a remarkably superior compatibility with difluoromethane (HFC32) as compared to the conventional working fluid compositions, by including a particular ester therein.

As a result of intense research in view of the above problems, the present inventors have found that the object can be accomplished by the use of a particular ester compound, and thus have completed the present invention.

Specifically, the present invention essentially relates to a working fluid composition for a refrigerating machine comprising difluoromethane and a refrigeration oil comprising an ester formed between:

(a) an aliphatic polyhydric alcohol having a carbon number of 2 to 12; and
(b) a saturated aliphatic monocarboxylic acid having a carbon number of 4 to 9, or a derivative thereof, the ratio of the number of acyl groups having a branched chain or branched chains to the number of the entire acyl groups in the ester being not less than 95%.

DETAILED DESCRIPTION OF THE INVENTION

The working fluid composition for a refrigerating machine of the present invention contains a refrigeration oil using an ester as a base oil. Specific examples of an aliphatic polyhydric alcohol for the component (a) used for obtaining the above ester include hindered alcohols such as neopentyl glycol, 2-ethyl-2-methyl-1,3-propanediol, 2-isopropyl-2-methyl-1,3-propanediol, 2,2-diethyl-1,3-propanediol, 2-n-butyl-2-ethyl-1,3-propanediol, di(3-hydroxy-2,2-dimethylpropyl) ether, trimethylolethane, trimethylolpropane, pentaerythritol, ditrimethylolethane, ditrimethylolpropane and dipentaerythritol; and polyhydric alcohols such as ethylene glycol, diethylene glycol, triethylene glycol, tetraethylene glycol, pentaethylene glycol, propylene glycol, dipropylene glycol, tripropylene glycol, 1,3-propanediol, 1,2-butanediol, 1,3-butanediol, 1,4-butanediol, 2,3-butanediol, 2-methyl-1,2-propanediol, 2-methyl-1,3-propanediol, 1,2-pentanediol, 1,3-pentanediol, 1,4-pentanediol, 1,5-pentanediol, 2,4-pentanediol, 1,2-hexanediol, 1,5-hexanediol, 1,6-hexanediol, 2,5-hexanediol, 3,3-dimethyl-1,2-butanediol, 2-methyl-2,4-pentanediol, 2,3-dimethyl-2,3-butanediol, 1,7-heptanediol, 2-ethyl-1,3-hexanediol, 2,4-dimethyl-2,4-pentanediol, 1,2-octanediol, 1,8-octanediol, 2,5-dimethyl-2,5-hexanediol, 2,2,4-trimethyl-1,3-pentanediol, 1,9-nonanediol, 1,2-decanediol, 1,10-decanediol, glycerol, diglycerol, triglycerol, tetraglycerol, 1,2,4-butanetriol, 1,2,6-hexanetriol and 1,2,3,4-butanetetrol. The carbon number of these aliphatic polyhydric alcohols is 2 to 12, preferably 2 to 7. When the carbon number exceeds 12, the resulting ester has a poor compatibility with difluoromethane. The number of hydroxyl groups is preferably 2 to 6. When the hydroxyl group exceed 6, the viscosity becomes undesirably high, and the resulting ester has a poor compatibility with difluoromethane. Also, from the aspect of heat resistance, the hindered alcohols, particularly neopentyl glycol, 2-ethyl-2-methyl-1,3-propanediol, 2,2-diethyl-1,3-propanediol, trimethylolethane, trimethylolpropane, pentaerythritol and dipentaerythritol, are excellent.

A saturated aliphatic monocarboxylic acid for the component (b) has a carbon number of 4 to 9, preferably 5 to 9. When the carbon number exceeds 9, the resulting ester has a poor compatibility with difluoromethane. Also, when the carbon number is less than 4, the metal corrosion is likely to increase. Specific examples of these monocarboxylic acids include straight-chain saturated aliphatic monocarboxylic acids such as butyric acid, valeric acid, caproic acid, enanthic acid, caprylic acid and pelargonic acid; branched saturated aliphatic monocarboxylic acids such as isobutyric acid, isovaleric acid, pivalic acid, 2-methylbutyric acid, 2-methylvaleric acid, 3-methylvaleric acid, 4-methylvaleric acid, 2,2-dimethylbutyric acid, 2-ethylbutyric acid, tert-butylacetic acid, cyclopentanecarboxylic acid, 2,2-dimethylpentanoic acid, 2,4-dimethylpentanoic acid, 2-ethylpentanoic acid, 3-ethylpentanoic acid, 2-methylhexanoic acid, 3-methylhexanoic acid, 4-methylhexanoic acid, 5-methylhexanoic acid, cyclohexanecarboxylic acid, cyclopentylacetic acid, 2-ethylhexanoic acid, 3-ethylhexanoic acid, 3,5-dimethylhexanoic acid, 2,4-dimethylhexanoic acid, 3,4-dimethylhexanoic acid, 4,5-dimethylhexanoic acid, 2,2-dimethylhexanoic acid, 2-methylheptanoic acid, 3-methylheptanoic acid, 4-methylheptanoic acid, 5-methylheptanoic acid, 6-methylheptanoic acid, 2-propylpentanoic acid, cyclohexylacetic acid, 3-cyclopentylpropionic acid, 2,2-dimethylheptanoic acid, 3,5,5-trimethylhexanoic acid, 2-methyloctanoic acid, 2-ethylheptanoic acid, 3-methyloctanoic acid, 2-ethyl-2,3,3,-trimethylbutyric acid, 2,2,4,4-tetramethylpentanoic acid, 2,2,3,3-tetramethylpentanoic acid, 2,2,3,4-tetramethylpentanoic acid and 2,2-diisopropylpropionic acid.

Among these, examples of the carboxylic acids having a branched chain or branched chains at the α-position of the carbonyl group include isobutyric acid, pivalic acid, 2-methylbutyric acid, 2-methylvaleric acid, 2,2-dimethylbutyric acid, 2-ethylbutyric acid, cyclopentanecarboxylic acid, 2,2-dimethylpentanoic acid, 2,4-dimethylpentanoic acid, 2-ethylpentanoic acid, 2-methylhexanoic acid, cyclohexanecarboxylic acid, 2-ethylhexanoic acid, 2,4-dimethylhexanoic acid, 2,2-dimethylhexanoic acid, 2-methylheptanoic acid, 2-propylpentanoic acid, 2,2-dimethylheptanoic acid, 2-methyloctanoic acid, 2-ethylheptanoic acid, 2-ethyl-2,3,3,-trimethylbutyric acid, 2,2,4,4-tetramethylpentanoic acid, 2,2,3,3-tetramethylpentanoic acid, 2,2,3,4-tetramethylpentanoic acid, 2,2-diisopropylpropionic acid, etc.

Further, examples of the carboxylic acids having a branched chain or branched chains at the α-position of the carbonyl group, a total carbon number of the branched chain or the branched chains being 2 or more, include pivalic acid, 2,2-dimethylbutyric acid, 2-ethylbutyric acid, 2,2-dimethylpentanoic acid, 2-ethylpentanoic acid, 2-ethylhexanoic acid, 2,2-dimethylhexanoic acid, 2-propylpentanoic acid, 2,2-dimethylheptanoic acid, 2-ethylheptanoic acid, 2-ethyl-2,3,3,-trimethylbutyric acid, 2,2,4,4-tetramethylpentanoic acid, 2,2,3,3-tetramethylpentanoic acid, 2,2,3,4-tetramethylpentanoic acid, 2,2-diisopropylpropionic acid, etc.

Examples of the derivatives of the monocarboxylic acids include lower alkyl esters such as methyl ester and ethyl ester, acid anhydrides, etc. However, from the aspect of heat resistance, those having unsaturated bonds are undesirable.

In addition, from the viewpoint of the compatibility with difluoromethane and hydrolysis resistance, esters of branched saturated monocarboxylic acids are preferred to those of straight-chain saturated monocarboxylic acids. Therefore, in the ester for the present invention, the ratio of the number of acyl groups having a branched chain or branched chains to the number of the entire acyl groups in the ester is preferably not less than 95%. In the present invention, the acyl groups having a branched chain or branched chains as mentioned above refer to those preferably having a branched chain or branched chains at positions other than the α-position of the carbonyl group, but the acyl groups having a branched chain or branched chains at the α-position of the carbonyl group may be contained as long as the amount thereof is limitative to a specified range. The reason for such limitation is that the acyl groups having a branched chain or branched chains at the α-position of the carbonyl group are likely to reduce the compatibility of the resulting ester with difluoromethane. In particular, since the acyl groups having a branched chain or branched chains at the α-position of the carbonyl group, a total carbon number of the branched chain or the branched chains being 2 or more, are more likely to reduce the compatibility of the resulting ester with difluoromethane, the proportion of such acyl groups is desirably as low as possible, and it is only allowed to be included within a specified range. However, as described below, in the case of an ester having a relatively low kinematic viscosity at 40° C. of less than 30 cSt, the acyl groups having a branched chain or branched chains may consist of acyl groups alone having a branched chain or branched chains at the α-position of the carbonyl group. Even in these cases, it is not preferred to contain acyl groups having a branched chain or branched chains at the α-position of the carbonyl group, a total carbon number of the branched chain or the branched chains being 2 or more, in excess of the specified amount.

The esters used in the present invention may be classified into four types according to their kinematic viscosities as follows:

(1) Those having a kinematic viscosity at 40° C. of not less than 50 cSt and not more than 100 cSt;
(2) Those having a kinematic viscosity at 40° C. of not less than 30 cSt and less than 50 cSt;
(3) Those having a kinematic viscosity at 40° C. of not less than 10 cSt and less than 30 cSt; and
(4) Those having a kinematic viscosity at 40° C. of not less than 1 cSt and less than 10 cSt.

(1) In the ester having a kinematic viscosity at 40° C. of not less than 50 cSt and not more than 100 cSt, the ratio of the number of acyl groups having a branched chain or branched chains at the α-position of the carbonyl group to the number of the entire acyl groups in the ester is 0 to 85%, and the ratio of the number of acyl groups having a branched chain or branched chains at the α-position of the carbonyl group, a total carbon number of the branched chain or the branched chains being 2 or more, to the number of the entire acyl groups in the ester is 0 to 80%. More preferably, the ratio of the number of acyl groups having a branched chain or branched chains at the α-position of the carbonyl group to the number of the entire acyl groups in the ester is 0 to 85%, and the ratio of the number of acyl groups having a branched chain or branched chains at the α-position of the carbonyl group, a total carbon number of the branched chain or the branched chains being 2 or more, to the number of the entire acyl groups in the ester is 0 to 50%. Particularly preferably, the ratio of the number of acyl groups having a branched chain or branched chains at the α-position of the carbonyl group to the number of the entire acyl groups in the ester is 0 to 50%, and the ratio of the number of acyl groups having a branched chain or branched chains at the α-position of the carbonyl group, a total carbon number of the branched chain or the branched chains being 2 or more, to the number of the entire acyl groups in the ester is 0 to 30%.

(2) In the ester having a kinematic viscosity at 40° C. of not less than 30 cSt and less than 50 cSt, the ratio of the number of acyl groups having a branched chain or branched chains at the α-position of the carbonyl group to the number of the entire acyl groups in the ester is 0 to 95%, and the ratio of the number of acyl groups having a branched chain or branched chains at the α-position of the carbonyl group, a total carbon number of the branched chain or the branched chains being 2 or more, to the number of the entire acyl groups in the ester is 0 to 80%. More preferably, the ratio of the number of acyl groups having a branched chain or branched chains at the α-position of the carbonyl group to the number of the entire acyl groups in the ester is 0 to 95%, and the ratio of the number of acyl groups having a branched chain or branched chains at the α-position of the carbonyl group, a total carbon number of the branched chain or the branched chains being 2 or more, to the number of the entire acyl groups in the ester is 0 to 60%. Particularly preferably, the ratio of the number of acyl groups having a branched chain or branched chains at the α-position of the carbonyl group to the number of the entire acyl groups in the ester is 0 to 60%, and the ratio of the number of acyl groups having a branched chain or branched chains at the α-position of the carbonyl group, a total carbon number of the branched chain or the branched chains being 2 or more, to the number of the entire acyl groups in the ester is 0 to 40%.

(3) In the ester having a kinematic viscosity at 40° C. of not less than 10 cSt and less than 30 cSt, as described above, the acyl groups having a branched chain or branched chains may consist of the acyl groups alone having a branched chain or branched chains at the α-position of the carbonyl group, and the ratio of the number of acyl groups having a branched chain or branched chains at the α-position of the carbonyl group, a total carbon number of the branched chain or the branched chains being 2 or more, to the number of the entire acyl groups in the ester is 0 to 80%, preferably 0 to 60%. Particularly preferably, the ratio of the number of acyl groups having a branched chain or branched chains at the α-position of the carbonyl group to the number of the entire acyl groups in the ester is 0 to 60%, and the ratio of the number of acyl groups having a branched chain or branched chains at the α-position of the carbonyl group, a total carbon number of the branched chain or the branched chains being 2 or more, to the number of the entire acyl groups in the ester is 0 to 40%.

(4) In the ester having a kinematic viscosity at 40° C. of not less than 1 cSt and less than 10 cSt, as described above, the acyl groups having a branched chain or branched chains may consist of the acyl groups alone having a branched chain or branched chains at the α-position of the carbonyl group, and the ratio of the number of acyl groups having a branched chain or branched chains at the α-position of the carbonyl group, a total carbon number of the branched chain or the branched chains being 2 or more, to the number of the entire acyl groups in the ester is 0 to 80%, preferably 0 to 60%.

Specific examples of the esters described above include trimethylolpropane tri-3,5,5-trimethylhexanoate; neopentyl glycol di-3,5,5-trimethylhexanoate; neopentyl glycol di-2-ethylhexanoate; an ester formed between pentaerythritol and a mixed acid of 3-methylhexanoic acid and 5-methylhexanoic acid; an ester formed between trimethylolpropane and a mixed acid of 3-methylhexanoic acid and 5-methylhexanoic acid; an ester formed between neopentyl glycol and a mixed acid of 3-methylhexanoic acid and 5-methylhexanoic acid; an ester formed between pentaerythritol and a mixed acid of 2-methylhexanoic acid and 2-ethylhexanoic acid; an ester formed between trimethylolpropane and a mixed acid of 2-methylhexanoic acid and 2-ethylhexanoic acid; an ester formed between neopentyl glycol and a mixed acid of 2-methylhexanoic acid and 2-ethylhexanoic acid; an ester formed between pentaerythritol and a mixed acid consisting of 3,5-dimethylhexanoic acid, 4,5-dimethylhexanoic acid and 3,4-dimethylhexanoic acid; an ester formed between trimethylolpropane and a mixed acid consisting of 3,5-dimethylhexanoic acid, 4,5-dimethylhexanoic acid and 3,4-dimethylhexanoic acid; an ester formed between neopentyl glycol and a mixed acid consisting of 3,5-dimethylhexanoic acid, 4,5-dimethylhexanoic acid and 3,4-dimethylhexanoic acid; pentaerythritol tetra-2-ethylbutanoate; trimethylolpropane tri-2-ethylbutanoate; neopentyl glycol di-2-ethylbutanoate; pentaerythritol tetra-2-methylpentanoate; trimethylolpropane tri-2-methylpentanoate; neopentyl glycol di-2-methylpentanoate; pentaerythritol tetra-2-methylbutanoate; trimethylolpropane tri-2-methylbutanoate; neopentyl glycol di-2-methylbutanoate; pentaerythritol tetra-3-methylbutanoate; trimethylolpropane tri-3-methylbutanoate; neopentyl glycol di-3-methylbutanoate; an ester formed between pentaerythritol and a mixed acid of 2-methylbutanoic acid and 3,5,5-trimethylhexanoic acid; an ester formed between trimethylolpropane and a mixed acid of 2-methylbutanoic acid and 3,5,5-trimethylhexanoic acid; an ester formed between pentaerythritol and a mixed acid of 3-methylbutanoic acid and 3,5,5-trimethylhexanoic acid; an ester formed between trimethylolpropane and a mixed acid of 3-methylbutanoic acid and 3,5,5-trimethylhexanoic acid; an ester formed between pentaerythritol and a mixed acid of 2-ethylbutanoic acid and 3,5,5-trimethylhexanoic acid; an ester formed between trimethylolpropane and a mixed acid of 2-ethylbutanoic acid and 3,5,5-trimethylhexanoic acid; an ester formed between trimethylolpropane and a mixed acid of 2-methylpentanoic acid and 3,5,5-trimethylhexanoic acid; an ester formed between pentaerythritol and a mixed acid of 2-methylpentanoic acid and 3,5,5-trimethylhexanoic acid; an ester formed between pentaerythritol and a mixed acid consisting of 2-methylhexanoic acid, 2-ethylhexanoic acid and 3,5,5-trimethylhexanoic acid; an ester formed between trimethylolpropane and a mixed acid consisting of 2-methylhexanoic acid, 2-ethylhexanoic acid and 3,5,5-trimethylhexanoic acid; an ester formed between pentaerythritol and a mixed acid consisting of 3-methylhexanoic acid, 5-methylhexanoic acid and 3,5,5-trimethylhexanoic acid; an ester formed between trimethylolpropane and a mixed acid consisting of 3-methylhexanoic acid, 5-methylhexanoic acid and 3,5,5-trimethylhexanoic acid; an ester formed between pentaerythritol and a mixed acid consisting of 3-methylhexanoic acid, 5-methylhexanoic acid and 2-ethylhexanoic acid; an ester formed between trimethylolpropane and a mixed acid consisting of 3-methylhexanoic acid, 5-methylhexanoic acid and 2-ethylhexanoic acid; an ester formed between pentaerythritol and a mixed acid consisting of 3-methylhexanoic acid, 5-methylhexanoic acid, 3,5-dimethylhexanoic acid, 3,4-dimethylhexanoic acid and 4,5-dimethylhexanoic acid; an ester formed between trimethylolpropane and a mixed acid consisting of 3-methylhexanoic acid, 5-methylhexanoic acid, 3,5-dimethylhexanoic acid, 3,4-dimethylhexanoic acid and 4,5-dimethylhexanoic acid, etc. Also, from the aspect of the compatibility with hydrofluorocarbon refrigerants, the saponification value of the ester in the present invention is preferably not less than 250 mg KOH/g, more preferably not less than 280 mg KOH/g.

The esters used in the present invention can be obtained by a conventional esterification or transesterification of one or more polyhydric alcohols for the component (a) mentioned above and one or more monocarboxylic acids, the lower alkyl esters or the acid anhydrides thereof for the component (b) mentioned above.

It is preferable that the acid value of the ester in the present invention is as low as possible, normally not more than 0.1 mg KOH/g, preferably not more than 0.05 mg KOH/g, and more preferably not more than 0.03 mg KOH/g. When the acid value exceeds 0.1 mg KOH/g, the metal corrosion is undesirably likely to increase.

Also, the hydroxyl value of these esters is normally not less than 0.1 mg KOH/g and not more than 50 mg KOH/g, preferably not less than 0.1 mg KOH/g and not more than 30 mg KOH/g, and more preferably not less than 0.1 mg KOH/g and not more than 20 mg KOH/g. When the hydroxyl value exceeds 50 mg KOH/g, the hygroscopicity increases, and when it is less than 0.1 mg KOH/g, the wear resistance becomes poor.

In the present invention, it is desired that the two-phase separation temperature of the ester with difluoromethane is low, normally not more than 10° C., preferably not more than 0° C., and more preferably not more than −10° C.

The refrigeration oil using the ester in the present invention as a base oil can be mixed with mineral oils or synthetic oils such as poly α-olefin, alkylbenzene, esters other than those mentioned above, polyether, perfluoropolyether and phosphoric acid ester, as long as the compatibility with difluoromethane is not impaired. Also, in the refrigeration oil using the ester in the present invention as a base oil, the esters mentioned above may be used alone or in combination of two or more kinds. In the case of using two or more kinds, the conditions such as the ratio of the number of acyl groups having a branched chain or branched chains to the number of the entire acyl groups in the ester, the ratio of the number of acyl groups having a branched chain or branched chains at the α-position of the carbonyl group to the number of the entire acyl groups in the ester, and the ratio of the number of acyl groups having a branched chain or branched chains at the α-position of the carbonyl group, a total carbon number of the branched chain or the branched chains being 2 or more, to the number of the entire acyl groups in the ester are satisfactory as long as they are satisfied as the overall mixed esters.

In the refrigeration oil in the present invention, for the purpose of trapping water or carboxylic acid produced in the composition, it is effective to add a compound having an epoxy group or additives such as an orthoester and an acetal. For the purpose of protecting the metal surface from corrosion by carboxylic acid, it is effective to add benzotriazole and/or a benzotriazole derivative. For the purpose of improving the lubricity, it is effective to add triaryl phosphate and/or triaryl phosphite. For the purpose of improving the thermal stability, it is effective to add phenolic compounds having a radical trapping function or a metal deactivator capable of chelating. Among these additives, a preference is given to the addition of the compound having an epoxy group, an orthoester or the acetal, among which a particular preference is given to the addition of the compound having an epoxy group.

Examples of the compounds having an epoxy group include glycidyl ethers such as phenylglycidyl ether, butylglycidyl ether, 2-ethylhexylglycidyl ether, cresylglycidyl ether, neopentyl glycol diglycidyl ether, 1,6-hexanediol diglycidyl ether, glycerol triglycidyl ether, trimethylolpropane triglycidyl ether and pentaerythritol tetraglycidyl ether; glycidyl esters such as diglycidyl phthalate, diglycidyl cyclohexanedicarboxylate and diglycidyl adipate; epoxidated monoesters of fatty acids such as methyl epoxystearate and butyl epoxystearate; epoxidated vegetable oils, such as epoxidated soybean oil and epoxidated linseed oil; alicyclic epoxy compounds such as epoxycyclooctane, epoxycycloheptane, and a compound having an epoxycyclohexyl group and a compound having an epoxycyclopentyl group.

In the systems of CFC12 or monochlorodifluoromethane (HCFC22), both of which contain a chlorine atom, the chlorofluorocarbon decomposes to produce hydrochloric acid. For the purpose of trapping the hydrochloric acid, glycidyl ethers such as phenylglycidyl ether, epoxidated monoesters of fatty acids or epoxidated vegetable oils are added to naphthenic oil and other oils. As disclosed in Japanese Patent Laid-Open No. 63395/1982, a compound having an epoxycycloalkyl group, such as epoxycyclooctane, is added to polyether compound to prevent the deterioration of the polyether compound by hydrochloric acid.

However, because the acid resulting from a composition of difluoromethane and the ester described above in the present invention is not a strong acid like hydrochloric acid but mainly a saturated aliphatic monocarboxylic acid, the above-mentioned ordinary epoxy compounds have no significant effect. In the present invention, a preference is given to the use of a compound having an epoxycyclohexyl group and/or a compound having an epoxycyclopentyl group.

The compounds having an epoxycyclohexyl group and the compounds having an epoxycyclopentyl group used in the present invention have a carbon number of 5 to 40, preferably 5 to 25. Examples of such compounds include 1,2-epoxycyclohexane, 1,2-epoxycyclopentane, bis(3,4-epoxycyclohexylmethyl)adipate, bis(3,4-epoxy-6-methylcyclohexylmethyl)adipate, 3,4-epoxycyclohexylmethyl-3,4-epoxycyclohexanecarboxylate, exo-2,3-epoxynorbornane, 2-(7-oxabicyclo[4.1.0]hepto-3-yl)spiro(1,3-dioxane-5,3'-[7]oxabicyclo[4.1.0]heptane), 4-epoxyethyl-1,2-epoxycyclohexane and 4-(1'-methylepoxyethyl)-1,2-epoxy-2-methylcyclohexane. Although there is no limitation, 1,2-epoxycyclohexane, 1,2-epoxycyclopentane, bis(3,4-epoxycyclohexylmethyl)adipate, bis(3,4-epoxy-6-methylcyclohexylmethyl)adipate, 3,4-epoxycyclohexylmethyl-3,4-epoxycyclohexanecarboxylate and 2-(7-oxabicyclo[4.1.0]hepto-3-yl)spiro(1,3-dioxane-5,3'-[7]oxabicyclo[4.1.0]heptane are preferred.

In the present invention, these compounds having an epoxycyclohexyl group may be used singly or in combination, and the compounds having an epoxycyclopentyl group may also be used singly or in combination. Further, the compound having an epoxycyclohexyl group and the compound having an epoxycyclopentyl group may be used in combination. The amount of these compounds added is normally 0.05 to 2.0 parts by weight, preferably 0.1 to 1.5 parts by weight and more preferably 0.1 to 1.0 part by weight, based on 100 parts by weight of the ester used in the present invention. Where necessary, these compounds having an epoxycyclohexyl group or an epoxycyclopentyl group may be used in combination with other epoxy compounds such as glycidyl ether.

The orthoesters used in the present invention have a carbon number of 4 to 70, preferably 4 to 50. Examples thereof include methyl orthoformate, ethyl orthoformate, propyl orthoformate, isopropyl orthoformate, butyl orthoformate, isobutyl orthoformate, pentyl orthoformate, hexyl orthoformate, 2-ethylhexyl orthoformate, methyl orthoacetate, ethyl orthoacetate, propyl orthoacetate, isopropyl orthoacetate, butyl orthoacetate, isobutyl orthoacetate, pentyl orthoacetate, hexyl orthoacetate, 2-ethylhexyl orthoacetate, methyl ortho-2-ethylhexanoate, ethyl ortho-2-ethylhexanoate, propyl ortho-2-ethylhexanoate, isopropyl ortho-2-ethylhexanoate, butyl ortho-2-ethylhexanoate, isobutyl ortho-2-ethylhexanoate, pentyl ortho-2-ethylhexanoate, hexyl ortho-2-ethylhexanoate, 2-ethylhexyl ortho-2-ethylhexanoate, etc.

The amount of the orthoester added is normally 0.01 to 100 parts by weight, preferably 0.05 to 30 parts by weight, based on 100 parts by weight of the ester used in the present invention.

The acetals used in the present invention have a carbon number of 4 to 70, preferably 4 to 50. Examples thereof include cyclohexanone ethylene ketal, cyclohexanone methylethylene ketal, cyclohexanone 2,2-dimethyltrimethylene ketal, cyclohexanone dimethyl acetal, cyclohexanone diethyl acetal, acetone ethylene ketal, acetone methylethylene ketal, acetone 2,2-dimethyltrimethylene ketal, acetone dimethyl acetal, acetone diethyl acetal, methyl ethyl ketone ethylene ketal, methyl ethyl ketone methylethylene ketal, methyl ethyl ketone 2,2-dimethyltrimethylene ketal, methyl ethyl ketone dimethyl acetal, methyl ethyl ketone diethyl acetal, methyl isobutyl ketone ethylene ketal, methyl isobutyl ketone methylethylene ketal, methyl isobutyl ketone 2,2-dimethyltrimethylene ketal, methyl isobutyl ketone dimethyl acetal, methyl isobutyl ketone diethyl acetal, diisopropyl ketone ethylene ketal, diisopropyl ketone methylethylene ketal, diisopropyl ketone 2,2-dimethyltrimethylene ketal, diisopropyl ketone dimethyl acetal, diisopropyl ketone diethyl acetal, benzaldehyde ethylene ketal, benzaldehyde methylethylene ketal, benzaldehyde 2,2-dimethyltrimethylene ketal, benzaldehyde dimethyl acetal, benzaldehyde diethyl acetal, etc.

The amount of the acetal added is normally 0.01 to 100 parts by weight, preferably 0.05 to 30 parts by weight, based on 100 parts by weight of the ester used in the present invention.

The benzotriazole and its derivatives used in the present invention have a carbon number of 6 to 50, preferably 6 to 30. Examples thereof include benzotriazole, 5-methyl-1H-benzotriazole, 1-dioctylaminomethylbenzotriazole, 1-dioctylaminomethyl-5-methylbenzotriazole, 2-(5'-methyl-2'-hydroxyphenyl)benzotriazole, 2-[2'-hydroxy-3',5'-bis($\alpha,\alpha$-dimethylbenzyl)phenyl]-2H-benzotriazole, 2-(3',5'-di-t-butyl-2'-hydroxyphenyl)benzotriazole, 2-(3'-t-butyl-5'-methyl-2'-hydroxyphenyl)-5-chlorobenzotriazole, 2-(3',5'-di-t-butyl-2'-hydroxyphenyl)-5-chlorobenzotriazole, 2-(3',5'-di-t-amyl-2'-hydroxyphenyl)benzotriazole, 2-(5'-t-butyl-2'-hydroxyphenyl)benzotriazole, 2-(2'-hydroxy-5'-methylphenyl)benzotriazole, 2-(2'-hydroxy-5'-t-octylphenyl)benzotriazole and 2-[2'-hydroxy-3'-(3'',4'',5'',6''-tetrahydrophthalimidomethyl)-5'-methylphenyl]benzotriazole, with a preference given to benzotriazole, 5-methyl-1H-benzotriazole and others.

Here, the amount of the benzotriazole and/or the benzotriazole derivatives added is normally 0.001 to 0.1 parts by weight, preferably 0.003 to 0.03 parts by weight, based on 100 parts by weight of the ester used in the present invention.

The triaryl phosphates or the triaryl phosphites used in the present invention have a carbon number of 18 to 70, preferably 18 to 50. Examples thereof include triaryl phosphates such as triphenyl phosphate, tricresyl phosphate, trixylenyl phosphate, cresyldiphenyl phosphate, xylenyldiphenyl phosphate, tris(tribromophenyl) phosphate, tris(dibromophenyl) phosphate, tris(2,4-di-t-butylphenyl) phosphate and trinonylphenyl phosphate; and triaryl phosphites such as triphenyl phosphite, tricresyl phosphite, trixylenyl phosphite, cresyldiphenyl phosphite, xylenyldiphenyl phosphite, tris(2,4-di-t-butylphenyl) phosphite, trinonylphenyl phosphite, tris(tribromophenyl) phosphite and tris(dibromophenyl) phosphite, with a preference given to triphenyl phosphate, tricresyl phosphate, trixylenyl phosphate, tris(2,4-di-t-butylphenyl) phosphate, triphenyl phosphite, tricresyl phosphite, trixylenyl phosphite and tris(2,4-di-t-butylphenyl) phosphite.

Here, the amount of the triaryl phosphate and/or the triaryl phosphite added is normally 0.1 to 5.0 parts by weight, preferably 0.5 to 2.0 parts by weight, based on 100 parts by weight of the ester used in the present invention.

The phenolic compounds having a radical trapping function used in the present invention have a carbon number of 6 to 100, preferably 10 to 80. Examples thereof include 2,6-di-t-butylphenol, 2,6-di-t-butyl-4-methylphenol, 4,4'-methylenebis(2,6-di-t-butylphenol), 4,4'-butylidenebis(3-methyl-6-t-butylphenol), 2,2'-methylenebis(4-ethyl-6-t-butylphenol), 2,2'-methylenebis(4-methyl-6-t-butylphenol), 4,4'-isopropylidenebisphenol, 2,4-dimethyl-6-t-butylphenol, tetrakis[methylene-3-(3,5-di-t-butyl-4-hydroxyphenyl)propionate]methane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, 2,2'-dihydroxy-3,3'-di($\alpha$-methylcyclohexyl)-5,5'-dimethyldiphenylmethane, 2,2'-isobutylidenebis(4,6-dimethylphenol), bis[3,3-bis(4'-hydroxy-3'-t-butylphenyl)butyric acid glycol ester, 2,6-bis(2'-hydroxy-3'-t-butyl-5'-methylbenzyl)-4-methylphenol, 1,1'-bis(4-hydroxyphenyl)cyclohexane, 2,5-di-t- amylhydroquinone, 2,5-di-t-butylhydroquinone, 1,4-dihydroxyanthraquinone, 3-t-butyl-4-hydroxyanisole, 2-t-butyl-4-hydroxyanisole, 2,4-dibenzoyl resorcinol, 4-t-butyl catechol, 2,6-di-t-butyl-4-ethylphenol, 2-hydroxy-4-methoxybenzophenone, 2,4-dihydroxybenzophenone, 2,2'-dihydroxy-4-methoxybenzophenone, 2,4,5-trihydroxybenzophenone, α-tocopherol, bis[2-(2-hydroxy-5-methyl-3-t-butylbenzyl)-4-methyl-6-t-butylphenyl]terephthalate, triethylene glycol-bis[3-(3-t-butyl-5-methyl-4-hydroxyphenyl) propionate], 1,6-hexanediol-bis[3-(3,5-di-t-butyl-4-hydroxyphenyl) propionate], 3,9-bis[2-(3-t-butyl-4-hydroxy-5-methylphenyl) propionyloxy]-1,1-dimethylethyl]-2,4,8,10-tetraoxaspiro[5.5]undecane, etc. with a preference given to 2,6-di-t-butylphenol, 2,6-di-t-butyl-4-methylphenol, 4,4'-methylenebis(2,6-di-t-butylphenol), 4,4'-butylidenebis(3-methyl-6-t-butylphenol), 2,2'-methylenebis(4-ethyl-6-t-butylphenol), 2,2'-methylenebis(4-methyl-6-t-butylphenol), 4,4'-isopropylidenebisphenol, 2,4-dimethyl-6-t-butylphenol, tetrakis[methylene-3-(3,5-di-t-butyl-4-hydroxyphenyl) propionate]methane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, 2,6-di-t-butyl-4-ethylphenol, 2,6-bis(2'-hydroxy-3'-t-butyl-5'-methylbenzyl)-4-methylphenol, bis[2-(2-hydroxy-5-methyl-3-t-butylbenzyl)-4-methyl-6-t-butylphenyl]terephthalate, triethylene glycol-bis[3-(3-t-butyl-5-methyl-4-hydroxyphenyl) propionate], 1,6-hexanediol-bis[3-(3,5-di-t-butyl-4-hydroxyphenyl) propionate], etc.

Here, the amount of the phenolic compound added is normally 0.05 to 2.0 parts by weight, preferably 0.05 to 0.5 parts by weight, based on 100 parts by weight of the ester used in the present invention.

The metal deactivator used in the present invention is preferably capable of chelating and has a carbon number of 5 to 50, preferably 5 to 20. Examples thereof include N,N'-disalicylidene-1,2-diaminoethane, N,N'-disalicylidene-1,2-diaminopropane, N-salicylidene-N'-dimethyl-1,2-diaminoethane, N,N'-disalicylidenehydrazine, N,N'-bis(α,5-dimethylsalicylidene)-1,2-diaminoethane, N,N'-bis(α,5-dimethylsalicylidene)-1,3-propanediamine, N,N'-bis(α,5-dimethylsalicylidene)-1,6-hexanediamine, N,N'-bis(α,5-dimethylsalicylidene)-1,10-decanediamine, N,N'-bis(α,5-dimethylsalicylidene)ethylenetetramine, salicylaldoxime, 2-hydroxy-5-methylacetophenoxime, acetylacetone, ethyl acetoacetate, 2-ethylhexyl acetoacetate, dimethyl malonate, diethyl malonate, di-2-ethylhexyl malonate, anthranilic acid, nitrilotriacetic acid, dihydroxyethylglycine, hydroxyethylethylenediaminetriacetic acid, hydroxyethyliminodiacetic acid, ethylenediamine, 3-mercapto-1,2-propanediol, alizarin, quinizarin, mercaptobenzothiazole and others, with a preference given to N,N'-disalicylidene-1,2-diaminoethane, N,N'-disalicylidene-1,2-diaminopropane, acetylacetone, ethyl acetoacetate, 2-ethylhexyl acetoacetate, alizarin, quinizarin and others.

The amount of metal deactivator added is normally 0.001 to 2.0 parts by weight, preferably 0.003 to 0.5 parts by weight, based on 100 parts by weight of the ester used in the present invention.

In addition to the additives shown above, commonly used lubricating oil additives such as antioxidants, extreme-pressure additives, oiliness improvers and defoaming agents may be added as necessary.

Examples of the antioxidants which can be used in the present invention include amine-based antioxidants such as p,p-dioctylphenylamine, monooctyldiphenylamine, phenothiazine, 3,7-dioctylphenothiazine, phenyl-1-naphthylamine, phenyl-2-naphthylamine, alkylphenyl-1-naphthylamine and alkylphenyl-2-naphthylamine; and sulfur-based antioxidants such as alkyl disulfide, thiodipropionic acid esters and benzothiazole; zinc dialkyldithiophosphate, zinc diaryldithiophosphate, etc. The amount of the antioxidants added is 0.05 to 2.0 parts by weight, based on 100 parts by weight of the ester.

Examples of the extreme-pressure additives or oiliness improvers which can be used in the present invention include zinc compounds such as zinc dialkyl dithiophosphate and zinc diaryl dithiophosphate, sulfur compounds such as thiodipropionic acid esters, dialkyl sulfide, dibenzyl sulfide, dialkyl polysulfide, alkyl mercaptan, dibenzothiophene and 2,2'-dithiobis(benzothiazole), phosphorus compounds such as trialkyl phosphite and trialkyl phosphate, chlorine compounds such as chlorinated paraffin, molybdenum compounds such as molybdenum dithiocarbamate, molybdenum dithiophosphate and molybdenum disulfide, fluorine compounds such as perfluoroalkyl polyether, trifluorochloroethylene polymer and graphite fluoride, silicon compounds such as fatty acid-modified silicone, and graphite. The amount of these extreme-pressure additives or oiliness improvers added is 0.05 to 10 parts by weight, based on 100 parts by weight of the ester used in the present invention.

Examples of substances which can be used as defoaming agents include silicone oils such as dimethylpolysiloxane and organosilicates such as diethyl silicate. The amount of these defoaming agents added is 0.0005 to 1 parts by weight, based on 100 parts by weight of the ester used in the present invention.

An additive such as an organic tin compound or boron compound which stabilizes hydrofluorocarbon refrigerants may also be added. The amount of the additives added is 0.001 to 10 parts by weight, based on 100 parts by weight of the ester used in the present invention.

The working fluid composition for refrigerating machine of the present invention comprises difluoromethane and the refrigeration oil using the ester in the present invention as a base oil. Difluoromethane may be used alone as a refrigerant or in combination with other hydrofluorocarbons. Examples of hydrofluorocarbons used in combination with difluoromethane include 1,1-difluoroethane (HFC152a), 1,1,1-trifluoroethane (HFC143a), 1,1,1,2-tetrafluoroethane (HFC134a), 1,1,2,2-tetrafluoroethane (HFC134), pentafluoroethane (HFC125) and trifluoromethane (HFC23), and it is particularly preferable to use 1,1,1,2-tetrafluoroethane or pentafluoroethane in combination with difluoromethane. The mixing ratio of difluoromethane/other hydrofluorocarbons is 5/95 to 100/0 (weight ratio).

The working fluid composition for refrigerating machine of the present invention can easily be prepared by mixing a hydrofluorocarbon containing difluoromethane and the ester used in the present invention or oils comprising the ester and the above-mentioned additives by a conventional method. The mixing ratio of hydrofluorocarbon/oil is normally 5/1 to 1/10, preferably 2/1 to 1/5 (weight ratio).

Since the working fluid composition for a refrigerating machine of the present invention contains the above-mentioned ester, it is excellent not only in compatibility, lubricity, and electric insulating property but also in thermal stability as compared to the conventional products.

Therefore, the working fluid composition of the present invention can be used in a refrigeration cycle for various compression refrigerating machines. Also, the present invention provides a process of refrigeration comprising subjecting a working fluid to a refrigeration cycle, and an improved process of refrigeration can be achieved by utilizing the working fluid.

EXAMPLES

The present invention is hereinafter described in more detail by means of the following working production examples and test examples, but the present invention is not limited thereto.

Production Example 1

A 1-liter four-necked flask was equipped with a stirrer, a thermometer, a nitrogen inlet tube and a dehydrating tube with a condenser. In the flask, 134 g (1.00 mol) of trimethylolpropane and 474.0 g (3.00 mol) of 3,5,5-trimethylhexanoic acid were placed. The reaction was carried out under normal pressure in a nitrogen stream at 250° C. for 2 hours, followed by an additional reaction under reduced pressure at 150 torr for 6 hours. Thereafter, the unreacted monocarboxylic acid was removed under a reduced pressure to yield an ester "A" used in the present invention as a residue.

Also, using the alcohols and carboxylic acids shown in Table 1, the similar reactions as above were carried out to yield esters "B" through "I" used in the present invention and esters "a" through "e" used in comparative examples.

The kinematic viscosity at 40° C. and 100° C. and viscosity index (JIS K-2283) for these esters were measured. Pour point (JIS K-2269) was also measured. The results are also shown in Table 1.

TABLE I

| Ester | Polyhydric Alcohol | Monocarboxylic Acid (Molar Number per 1 mol of Polyhydric Alcohol) | Viscosity(cst) at 40° C. | Viscosity(cst) at 100° C. | Viscosity Index | Pour Point (°C.) |
|---|---|---|---|---|---|---|
| A | Trimethylolpropane | 3,5,5-Trimethylhexanoic acid (3.00 mol) | 51.9 | 7.13 | 94 | −45> |
| B | Trimethylolpropane | 3,5,5-Trimethylhexanoic acid (2.47 mol) 2-Methylhexanoic acid (0.41 mol) 2-Ethylpentanoic acid (0.12 mol) | 41.5 | 6.29 | 98 | −45> |
| C | Trimethylolpropane | 3,5,5-Trimethylhexanoic acid (1.66 mol) 3-Methylhexanoic acid (0.82 mol) 5-Methylhexanoic acid (0.37 mol) 2,4-Dimethylhexanoic acid (0.15 mol) | 31.1 | 5.64 | 122 | −45> |
| D | Trimethylolpropane | 2-Ethylhexanoic acid (3.00 mol) | 24.1 | 4.26 | 65 | −45> |
| E | Pentaerythritol | 3-Methylhexanoic acid (2.72 mol) 5-Methylhexanoic acid (1.28 mol) | 32.0 | 5.51 | 109 | −45> |
| F | Pentaerythritol | 2-Methylhexanoic acid (2.54 mol) 2-Ethylpentanoic acid (0.72 mol) 3,5-Dimethylhexanoic acid (0.33 mol) 4,5-Dimethylhexanoic acid (0.28 mol) 3,4-Dimethylhexanoic acid (0.13 mol) | 31.1 | 5.38 | 107 | −45> |
| G | Neopentyl glycol | 3,5,5-Trimethylhexanoic acid (2.00 mol) | 13.1 | 3.14 | 100 | −45> |
| H | Trimethylolpropane | 3-Methylhexanoic acid (2.04 mol) 5-Methylhexanoic acid (0.96 mol) | 17.9 | 3.75 | 94 | −45> |
| I | Neopentyl glycol | 2-Ethylhexanoic acid (2.00 mol) | 7.35 | 2.01 | 44 | −45> |
| a | Trimethylolpropane | 2-Heptylundecanoic acid (3.00 mol) | 65.6 | 9.85 | 133 | −45> |
| b | Pentaerythritol | Enanthic acid (1.00 mol) Caprylic acid (1.36 mol) 3,5-Dimethylhexanoic acid (0.74 mol) 4,5-Dimethylhexanoic acid (0.61 mol) 3,4-Dimethylhexanoic acid (0.29 mol) | 32.7 | 5.81 | 123 | −45> |
| c | Trimethylolpropane | Caprylic acid (0.84 mol) 2-Methylhexanoic acid | 25.0 | 4.83 | 117 | −45> |

TABLE I-continued

| Ester | Polyhydric Alcohol | Monocarboxylic Acid (Molar Number per 1 mol of Polyhydric Alcohol) | Viscosity(cst) at 40° C. | Viscosity(cst) at 100° C. | Viscosity Index | Pour Point (°C.) |
|---|---|---|---|---|---|---|
|   |   | (1.68 mol) 2-Ethylpentanoic acid (0.48 mol) |   |   |   |   |
| d | Trimethylolpropane | Enanthic acid (3.00 mol) | 13.8 | 3.40 | 122 | −45> |
| e | Neopentyl glycol | Caprylic acid (2.00 mol) | 6.94 | 2.19 | 126 | −45> |

Test Example 1

The compatibility of the esters "A" through "I" or the esters "a" through "e" obtained in Production Example with difluoromethane (HFC32) or a mixed refrigerant of difluoromethane and 1,1,1,2-tetrafluoroethane (HFC134a) was evaluated.

TABLE 2

|   | Ester Used in Present Invention | Refrigerant (weight ratio) |
|---|---|---|
|   | Present Inventive Product |   |
| (1) | A | HFC32(100) |
| (2) | A | HFC32(50) HFC134a(50) |
| (3) | A | HFC32(30) HFC134a(70) |
| (4) | B | HFC32(100) |
| (5) | C | HFC32(100) |
| (6) | C | HFC32(50) HFC134a(50) |
| (7) | A (40 parts by weight) D (60 parts by weight) | HFC32(100) |
| (8) | E | HFC32(100) |
| (9) | F | HFC32(100) |
| (10) | G | HFC32(100) |
| (11) | H | HFC32(100) |
| (12) | D | HFC32(100) |
| (13) | I | HFC32(100) |
|   | Comparative Product |   |
| (1) | a | HFC32(100) |
| (2) | b | HFC32(100) |
| (3) | c | HFC32(100) |
| (4) | d | HFC32(100) |
| (5) | e | HFC32(100) |

With respect to each of the present inventive products (1) through (13) and the comparative products (1) through (5) shown in Table 2 which are obtained by mixing the esters "A" through "I" or the esters "a" through "e" with difluoromethane (HFC32) or a mixed refrigerant of difluoromethane and 1,1,1,2-tetrafluoroethane (HFC134a), a two-phase separation temperature at a low temperature was measured. The results are shown in Table 3. As is evident from Table 3, the present inventive products are superior in compatibility with refrigerant, when compared to the comparative products.

In Examples, as for the mixed refrigerant, only the mixed refrigerant of difluoromethane and 1,1,1,2-tetrafluoroethane is exemplified. Pentafluoroethane (HFC125) has smaller dipole moment and smaller polarized distribution of electron density, which are calculated by the molecular orbital method, than those of difluoromethane and 1,1,1,2-tetrafluoroethane. Therefore, the mixed refrigerant of difluoromethane and pentafluoroethane presumably has a similarly excellent compatibility as shown above.

TABLE 3

|   | Low-Separation Temperature (°C.) | |
|---|---|---|
|   | 10 vol %[#1] | 20 vol %[#1] |
|   | Present Inventive Product | |
| (1) | −6 | No Measurement |
| (2) | −30 | −15 |
| (3) | −37 | −30 |
| (4) | −10 | No Measurement |
| (5) | −14 | No Measurement |
| (6) | −34 | −20 |
| (7) | −3 | No Measurement |
| (8) | −7 | No Measurement |
| (9) | −5 | No Measurement |
| (10) | −42 | No Measurement |
| (11) | −24 | −7 |
| (12) | −1 | No Measurement |
| (13) | −38 | No Measurement |
|   | Comparative Product | |
| (1) | 0< | No Measurement |
| (2) | 0< | No Measurement |
| (3) | 0< | No Measurement |
| (4) | 0< | No Measurement |
| (5) | 0< | No Measurement |

Note [#1] Concentration by volume of ester in refrigerant.

Test Example 2

With respect to each of the present inventive products (1) through (13) shown in Table 2, a sealed tube test was conducted under the conditions shown below to evaluate the thermal stability.

Specifically, 10 g of the ester used in the present invention prepared in advance so as to have a water concentration of not more than 10 ppm and an acid value of not more than 0.01 mg KOH/g and 5 g of either difluoromethane (HFC 32) alone or a mixed refrigerant of difluoromethane and 1,1,1,2-tetrafluoroethane (HFC134a) were placed into a glass tube. Iron, copper and aluminum were added thereto as catalysts, and the glass tube was sealed. After testing at 175° C. for 14 days, the appearance of the present inventive products and the presence or absence of precipitates were evaluated. The results are shown in Table 4.

TABLE 4

| Present Inventive Product | Appearance | Precipitate |
|---|---|---|
| (1) | good | none |
| (2) | good | none |
| (3) | good | none |
| (4) | good | none |
| (5) | good | none |
| (6) | good | none |
| (7) | good | none |
| (8) | good | none |
| (9) | good | none |
| (10) | good | none |
| (11) | good | none |
| (12) | good | none |

TABLE 4-continued

| Present Inventive Product | Appearance | Precipitate |
| --- | --- | --- |
| (13) | good | none |

As is evident from Table 4, since all of the present inventive products had good appearance and showed no precipitates, their thermal stabilities were good.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A working fluid composition for a refrigerating machine comprising:
   (i) difluoromethane and
   (ii) a refrigeration oil comprising an ester formed between:
      (a) an aliphatic polyhydric alcohol having a carbon number of 2 to 12; and
      (b) a saturated aliphatic monocarboxylic acid having a carbon number of 4 to 9 or a derivative thereof,
   the ratio of the number of acyl groups having a branched chain or branched chains to the number of the entire acyl groups in the ester being not less than 95%.

2. The working fluid composition according to claim 1, wherein the number of hydroxyl groups of said aliphatic polyhydric alcohol is 2 to 6.

3. The working fluid composition according to claim 1, wherein said aliphatic polyhydric alcohol is a hindered alcohol.

4. The working fluid composition according to claim 1, wherein the ester used as a base oil has a kinematic viscosity at 40° C. of not less than 50 cSt and not more than 100 cSt, and wherein the ratio of the number of acyl groups having a branched chain or branched chains at the α-position of the carbonyl group to the number of the entire acyl groups in the ester is 0 to 85%, and the ratio of the number of acyl groups having a branched chain or branched chains at the α-position of the carbonyl group, a total carbon number of the branched chain or the branched chains being 2 or more, to the number of the entire acyl groups in the ester is 0 to 80%.

5. The working fluid composition according to claim 1, wherein the ester used as a base oil has a kinematic viscosity at 40° C. of not less than 30 cSt and not more than 50 cSt, and wherein the ratio of the number of acyl groups having a branched chain or branched chains at the α-position of the carbonyl group to the number of the entire acyl groups in the ester is 0 to 95%, and the ratio of the number of acyl groups having a branched chain or branched chains at the α-position of the carbonyl group, a total carbon number of the branched chain or the branched chains being 2 or more, to the number of the entire acyl groups in the ester is 0 to 80%.

6. The working fluid composition according to claim 1, wherein the ester used as a base oil has a kinematic viscosity at 40° C. of not less than 10 cSt and not more than 30 cSt, and wherein the ratio of the number of acyl groups having a branched chain or branched chains at the α-position of the carbonyl group, a total carbon number of the branched chain or the branched chains being 2 or more, to the number of the entire acyl groups in the ester is 0 to 80%.

7. The working fluid composition according to claim 1, wherein the ester used as a base oil has a kinematic viscosity at 40° C. of not less than 1 cSt and not more than 10 cSt, and wherein the ratio of the number of acyl groups having a branched chain or branched chains at the α-position of the carbonyl group, a total carbon number of the branched chain or the branched chains being 2 or more, to the number of the entire acyl groups in the ester is 0 to 80%.

8. The working fluid composition according to claim 1, wherein the saponification value of the ester is not less than 250 mg KOH/g.

9. The working fluid composition according to claim 1, wherein the acid value of the ester is not more than 0.1 mg KOH/g.

10. The working fluid composition according to claim 1, wherein the hydroxyl value of the ester is 0.1 to 50 mg KOH/g.

11. The working fluid composition according to claim 1, wherein the components (i) and (ii) are contained in a weight ratio of (i)/(ii) in the range of 5/1 to 1/10.

12. A working fluid composition for use in a refrigeration cycle comprising:
   (i) difluoromethane and
   (ii) a refrigeration oil comprising an ester formed between:
      (a) an aliphatic polyhydric alcohol having a carbon number of 2 to 12; and
      (b) a saturated aliphatic monocarboxylic acid having a carbon number of 4 to 9 or a derivative thereof,
   the ratio of the number of acyl groups having a branched chain or branched chains to the number of the entire acyl groups in the ester being not less than 95%.

13. A process of refrigeration comprising subjecting a working fluid to a refrigeration cycle, wherein the working fluid is the working fluid of claim 12.

14. In a process for refrigeration utilizing a working fluid that is subjected to repeated refrigeration cycles, the improvement for which comprises using the working fluid of claim 12 as the working fluid.

* * * * *